United States Patent
Fredricksen et al.

(10) Patent No.: US 8,812,806 B2
(45) Date of Patent: Aug. 19, 2014

(54) METHOD AND SYSTEM FOR NON-DISRUPTIVE MIGRATION

(75) Inventors: John Fredricksen, Sunnyvale, CA (US); Chung-Yen Chang, Sunnyvale, CA (US); Nagender Somavarapu, Bangalore (IN)

(73) Assignee: Netapp, Inc., Sunnyvale, CA (US)

( * ) Notice: Subject to any disclaimer, the term of this patent is extended or adjusted under 35 U.S.C. 154(b) by 347 days.

(21) Appl. No.: 12/915,867

(22) Filed: Oct. 29, 2010

(65) Prior Publication Data

US 2012/0110279 A1    May 3, 2012

(51) Int. Cl.
*G06F 12/02* (2006.01)
*G06F 17/30* (2006.01)
*G06F 3/06* (2006.01)

(52) U.S. Cl.
CPC ........ *G06F 17/30079* (2013.01); *G06F 3/0647* (2013.01)
USPC ............................ 711/165; 711/161; 707/602

(58) Field of Classification Search
USPC .................................. 711/161, 165; 707/602
See application file for complete search history.

(56) References Cited

U.S. PATENT DOCUMENTS

| | | |
|---|---|---|
| 2007/0180493 A1 | 8/2007 | Croft et al. |
| 2007/0198656 A1 | 8/2007 | Mazzaferri et al. |
| 2008/0154993 A1 | 6/2008 | Rathi et al. |
| 2008/0222644 A1* | 9/2008 | Richards et al. ............. 718/104 |
| 2008/0281967 A1* | 11/2008 | Muhlestein et al. .......... 709/226 |
| 2010/0169253 A1* | 7/2010 | Tan ................................ 706/21 |

OTHER PUBLICATIONS

International Search Report on corresponding PCT application (PCT/US2011/057540) from International Searching Authority (USPTO) dated Mar. 16, 2012.

Written Opinion on corresponding PCT application (PCT/ US2011/ 057540) from International Searching Authority (USPTO) dated Mar. 16, 2012.

* cited by examiner

*Primary Examiner* — Jared Rutz (74) *Attorney, Agent, or Firm* — Klein, O'Neill & Singh, LLP (57) ABSTRACT

Method and system for migrating a virtual storage system from a source storage system having access to a source storage device to a destination storage system having access to a destination storage device is provided. A processor executable management application estimates a likelihood of success for a migration operation before the migration operation enters a cut-over duration during which client access to the source storage system and the destination storage system is restricted. The migration operation enters the cut-over duration if there is high likelihood of success for completing the migration during the cut-over duration or aborted, if there is a low likelihood of success for completing the migration during the cut-over duration.

24 Claims, 8 Drawing Sheets

FIG. 4

METHOD AND SYSTEM FOR NON-DISRUPTIVE MIGRATION

TECHNICAL FIELD

The present disclosure relates to storage systems.

BACKGROUND

Various forms of storage systems are used today. These forms include network attached storage (NAS) systems, storage area networks (SANs), and others. Network storage systems are commonly used for a variety of purposes, such as providing multiple users with access to shared data, backing up data and others.

A network storage system typically includes at least one computing system (may also be referred to as a "server"), which is a processing system configured to store and retrieve data on behalf of one or more client processing systems ("clients"). In the context of NAS, a storage server operates on behalf of one or more clients to store and manage shared files in a set of mass storage devices, such as magnetic or optical disks or tapes.

In a SAN context, the storage server provides clients with block-level access to stored data. Some storage systems may be capable of providing clients with both file-level access and block-level access.

Storage systems may be presented as virtual storage systems to clients. A virtual storage system may be migrated from a source storage system to a destination storage system. While information is being migrated, there may be applications that may still want to use the source storage system. It is desirable to migrate information in a non-disruptive manner so that clients can continue to use the source storage system. Continuous efforts are being made to efficiently migrate a virtual storage system from the source storage system to the destination storage system.

SUMMARY

In one embodiment, a method and system for migrating a virtual storage system from a source storage system having access to a source storage device to a destination storage system having access to a destination storage device is provided. A processor executable management application estimates a likelihood of success for a migration operation before the migration operation enters a "cut-over" duration. The cut-over duration is a time slot during the migration operation when client access to the source storage system and the destination storage system is restricted.

The management application estimates a workload for the processors used by both the source storage system and the destination storage system. The management application also estimates utilization of destination storage if the migration operation were to be completed. The estimated workload for the processors and the utilization of destination storage are compared to a first threshold value and a second threshold value. Based on the comparison, the management application predicts the likelihood of success for the migration operation. The migration operation enters the cut-over duration if there is a high likelihood of success or aborted, if there is a low likelihood of success.

In another embodiment, a machine implemented method for migrating a virtual storage system, in response to a migration request is provided. The virtual storage system is migrated from a source storage system having access to a source storage device to a destination storage system having access to a destination storage device.

The method includes determining a projected workload of the source storage system prior to a cut-over duration when access to the source storage system is restricted; and determining a projected work load of the destination storage system prior to the cut-over duration when access to the destination storage system is restricted; and determining projected utilization of the destination storage device if the virtual storage system were to be successfully migrated from the source storage system to the destination storage system.

The method further includes estimating a likelihood of success for completing a migration operation in response to the migration request; and then proceeding with the migration operation in response to the migration request based on the estimated likelihood of success.

In yet another embodiment, a method for migrating a virtual storage system managed by a source storage system having access to a source storage device to a destination storage system having access to a destination storage device is provided. The method includes estimating a likelihood of success for completing a migration operation based on a projected usage of the source storage system and the destination storage system prior to a cut-over duration when access to the source storage system and the destination storage system is restricted; and a projected utilization of the destination storage device if the migration operation were to be successfully completed. The method further includes aborting the migration operation, if the estimated likelihood of success is unacceptable.

In another embodiment, a machine implemented method for migrating a virtual storage system from a source storage system having access to a source storage device to a destination storage system having access to a destination storage device is provided. The method includes estimating a likelihood of success for migrating the virtual storage system from the source storage system to the destination storage system; determining if the estimated likelihood of success is acceptable or unacceptable; and aborting a migration operation if the estimated likelihood of success is unacceptable.

In yet another embodiment, a system is provided. The system includes a virtual storage system managed by a source storage system having access to a source storage device; and a destination storage system having access to a destination storage device. During a migration operation, the virtual storage system is migrated from the source storage system to the destination storage system. The system also includes a management application executed by a computing system that interfaces with the source storage system and the destination storage system for estimating a likelihood of success for completing the migration operation based on: (i) a projected usage of the source storage system and the destination storage system prior to a cut-over duration when access to the source storage system and the destination storage system is restricted; and (ii) a projected utilization of the destination storage device if the migration operation were to be successfully completed. The migration operation is aborted, if the estimated likelihood of success is unacceptable.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

In one embodiment, a method and system for migrating a virtual storage system from a source storage system having access to a source storage device to a destination storage system having access to a destination storage device is provided. A processor executable management application estimates a likelihood of success for a migration operation before the migration operation enters a "cut-over" duration. The cut-over duration is a time slot during the migration operation when client access to the source storage system and the destination storage system is restricted.

The management application estimates a workload for the processors used by both the source storage system and the destination storage system. The management application also estimates utilization of destination storage if the migration operation were to be completed. The estimated workload for the processors and utilization of destination storage are compared to a first threshold value and a second threshold value. Based on the comparison, the management application predicts the likelihood of success for the migration operation. The migration operation enters the cut-over duration if there is a high likelihood of success or, aborted if there is a low likelihood of success.

As a preliminary note, the terms "component", "module", "system," and the like as used in this disclosure are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

Figure 1A:
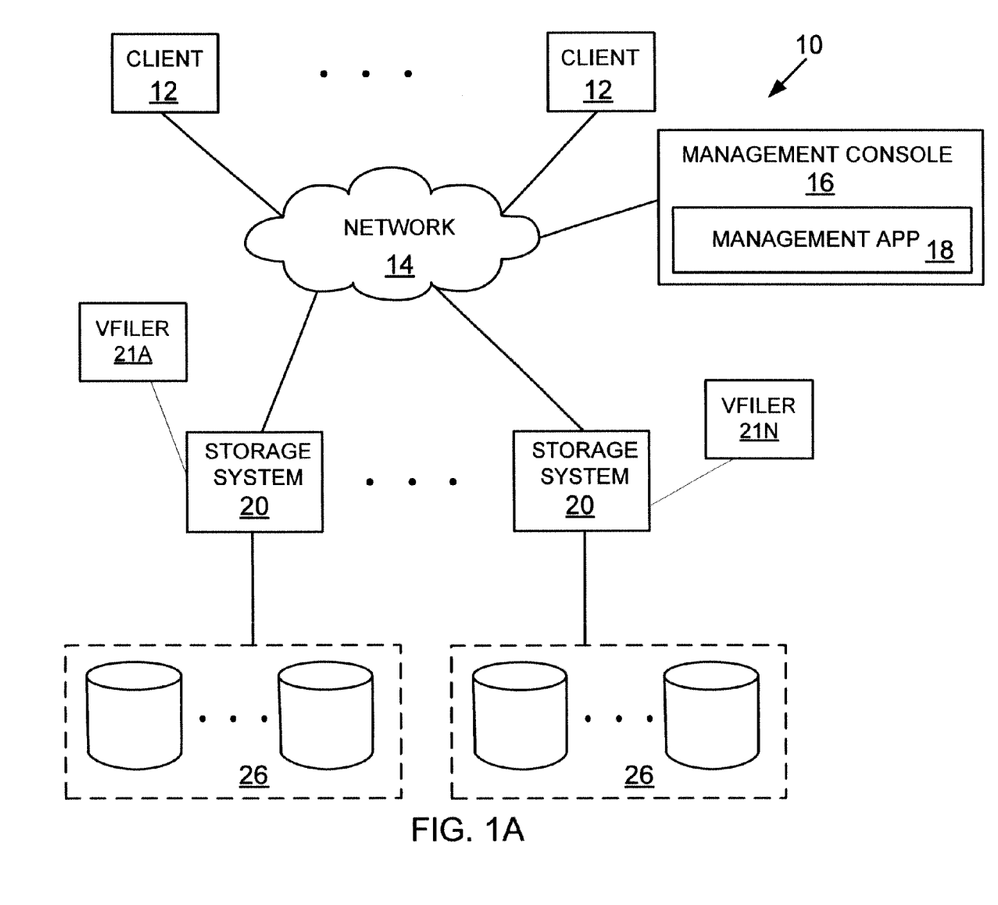
FIG. 1A shows a block diagram of a system using the embodiments disclosed herein.

System:

FIG. 1A shows an example of a system 10 where a virtual storage system is migrated according to the various embodiments of the present disclosure, as described below. System 10 may include a plurality of storage systems 20, each coupled to a separate mass storage subsystem 26 that may include a plurality of mass storage devices. The mass storage devices in each storage subsystem 26 may be, for example, conventional magnetic disks, optical disks such as CD-ROM or DVD based storage, magneto-optical (MO) storage, flash memory storage device or any other type of non-volatile storage devices suitable for storing data. The examples disclosed herein may reference a storage device as a "disk" but the adaptive embodiments disclosed herein are not limited to disks or any particular type of storage media/device.

Each storage subsystem 26 is managed by a corresponding storage system 20. The storage devices in each storage subsystem 26 can be organized into one or more RAID (redundant array of independent disks) groups, in which case the corresponding storage system 20 accesses the storage subsystem 26 using an appropriate RAID protocol.

Figure 1B:
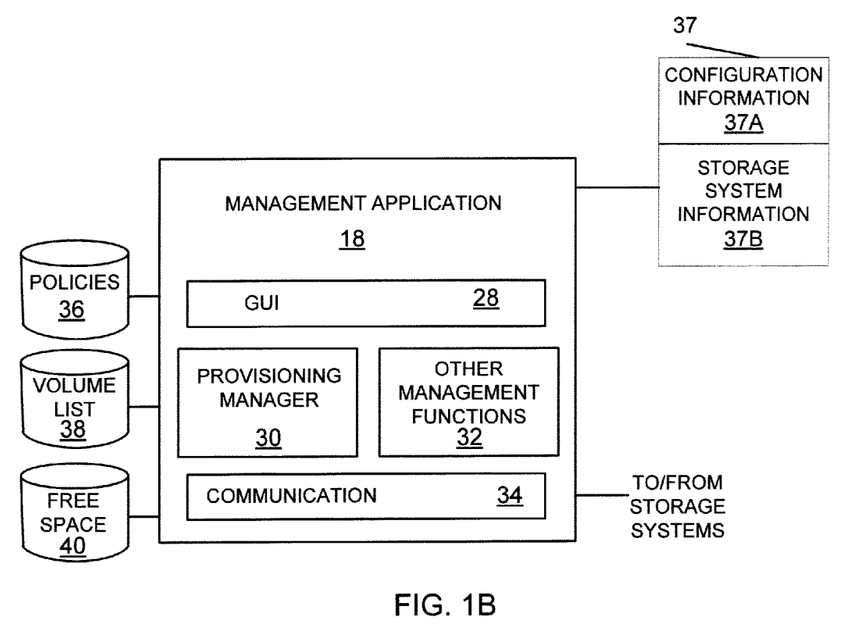
FIG. 1B shows a block diagram of a management application, used according to one embodiment of the present disclosure.

Each storage system 20 may operate as a NAS (network attached storage) based file server, a block-based storage server such as used in a storage area network (SAN), or a combination thereof, or a node in a clustered environment described below with respect to FIG. 1F, or any other type of storage server.

The storage systems 20 may be operationally coupled to a plurality of clients 12 through a network 14. Each storage system 20 receives and responds to various read and write requests from clients 12, directed to data stored in or to be stored in a corresponding storage subsystem 26.

Each client 12 may be, for example, a conventional personal computer (PC), workstation, or the like. The network 14 may be, for example, a local area network (LAN), a wide area network (WAN), or any other type of network or a combination of networks.

Each storage system 20 may be presented as one or more virtual storage system 21A-21N (also referred to as a "vfiler"). Each vfiler 21 is associated with a physical storage system 20. This allows one to present a physical storage system as shared multiple virtual storage systems.

Each vfiler is addressable by the client systems and can handle input/output commands, just like storage systems 20. Each vfiler may be assigned a unique address that may be used by a client to access the storage system. For example, each vfiler may be assigned an Internet Protocol (IP) address that is used by a client 12 to send input/output commands. The IP address may be assigned when the vfiler is configured using management application 18.

In some instances, a vfiler may be migrated from one storage system (also referred to as a source storage system) to another storage system (also referred to as a destination storage system). Details regarding vfiler migration are provided below in more detail.

Also connected to the network 14 is a management console 16 that may store and execute the management application 18 (may also be referred to as a storage management application 18). The management console 16 may be, for example, a conventional PC, a workstation, or the like. The management application 18 may be used by a storage network administrator to manage a pool of storage devices (may also be referred to as a resource pool). The management application 18 enables an administrator to perform various operations, such as monitoring and allocating storage space in the storage pool, creating and deleting volumes, directories and others. The management application 18 also allows an administrator to provision and configure storage space for non-disruptive migration.

In one embodiment, as described below in more detail, a non-disruptive migration operation for migrating a vfiler from a source storage system to a destination storage system is initiated. Before the migration operation is completed, during a cut-over duration, access to the source storage system and the destination storage system is restricted.

Before, proceeding with the migration operation during the cut-over duration and then completing the migration operation, the management application 18 executing executable code, analyzes the source storage system, the destination storage system and the destination storage device to predict whether the migration operation is likely to succeed. The prediction is based on estimating processor utilization during the cut-over duration for both the source storage system and the destination storage system, as well as estimating destination storage device utilization if the migration operation were to be completed.

The estimates determined by management application 18 are based on various parameters and data collected from the operating systems of the source and destination storage systems as well as commands and input from the clients. To obtain such information, communication between the management application 18, clients 12 and storage systems 20 may be accomplished using any of the various conventional communication protocols and/or application programming interfaces (APIs), the details of which are not germane to the technique being introduced here. This communication can be done through the network 14 or it can be via a direct link (not shown) between the management console 16 and one or more of the storage systems 20.

Management Application: FIG. 1B illustrates the management application 18 in greater detail for implementing the various processes described below, according to one embodiment. Management application 18 maintains various data structures for enabling non-disruptive migration, as described below in more detail.

In the illustrated embodiment, the management application 18 includes a graphical user interface (GUI) module 28 to generate a GUI (e.g., for use by an administrator); a provisioning manager module (may also be referred to as a provisioning manager) 30 for provisioning storage, gathering information from the storage systems and predicting the likelihood of successfully completing a migration operation, according to one embodiment; one or more other management modules 32 to perform various other storage management related functions; and a communication module 34. In another embodiment, the management application 18 may provide a command line interface (CLI) for use by an administrator for managing and configuring storage systems. The communication module 34 implements one or more conventional communication protocols and/or APIs to enable the management application 18 to communicate with the storage systems 20 and clients 12.

Provisioning manager 30 typically receives a provisioning request from a client 12. The provisioning manager 30 scans a storage resource pool, selects a storage space that best meets the user requirements, provisions the storage space and configures the provisioned storage space for migration.

In one embodiment, management application 18 generates and maintains a migration data structure 37 (may also be referred to as data structure 37) that may be used for configuring migration of a vfiler from one storage system to another storage system. Data structure 37 may be a table, a relational database, a data object or any other logical component that may be used to implement the adaptive embodiments, described herein. In one embodiment, data structure 37 may include various components 37A-37B that are now described below in detail.

In one embodiment, data structure 37 may include configuration information 37A for the provisioned storage. Configuration information 37A may include information regarding the storage devices used for migrating a vfiler. Configuration information 37A may include information regarding storage device type, for example, the storage device may be a Fibre Channel device, SATA device, SAS device and others. Configuration information 37A may also include serial numbers and firmware revision numbers for the storage devices. In one embodiment, configuration information 37A may be a table with a plurality of fields that are populated by provisioning manager 30.

Configuration information 37A is generated and maintained by management application 18. The information included in configuration information 37A may be obtained from various sources, including the storage systems, clients and storage subsystems. Management application 18 collects the information as part of a provisioning process or as a part of a configuration process for configuring the various components of the storage systems.

Data structure 37 may also include storage system information 37B (may also be referred to as data structure 37B). The storage system in this context means one or more storage systems (or nodes for a cluster system (FIG. 1F) that manage access to the provisioned storage. Storage system information 37B may be populated by management application 18.

Storage system information 37B includes processor utilization data obtained from a source storage system and a destination storage system. Storage system information 37B may also include information regarding a number of sequential write operations and random write operations at both the source and destination storage system, before the cut-over duration starts. Storage 37B also includes a number of sequential read operations and random read operations at the destination storage system, before the cut-over duration starts.

Storage system information 37B also includes various parameters that allow management application 18 to estimate utilization of a destination storage device after a migration operation is completed. The various parameters are typically maintained by the operating systems of the respective storage systems and then obtained by management application 18. The use of storage system information 37B is described below in detail.

Storage system information 37B may also include information regarding the capabilities of the storage systems. For example, storage system information 37B may include information regarding whether a storage system 20 is capable of hosting a vfiler, and whether the storage system is a part of a clustered system and uses a global namespace for communication.

Global namespace in this context refers to a virtual hierarchical collection of unique volume names or identifiers and directory paths to the volumes, in which the volumes are stored on multiple server nodes within a clustered storage server system as described below with respect to FIG. 1F. In the context of the present disclosure, the global namespace of a clustered storage server system can be extended to include not only the identifiers of volumes stored on the multiple nodes of the clustered system, but also the identifiers of volumes stored on one or more storage systems that are remote from and do not constitute a part of the clustered system.

The term "volume" as used herein is a logical data set which is an abstraction of physical storage, combining one or more physical mass storage devices (e.g., disks) or parts thereof into a single logical storage object, and which is managed as a single administrative unit, such as a single file system. A volume is typically defined from a larger group of available storage, such as an aggregate.

Storage system information 37B is generated and maintained by management application 18. The management application 18 may obtain the foregoing information by polling the storage systems or may be stored when the storage system is configured and updated by management application 18.

In one embodiment, although data structure 37 is shown to have multiple components, for example, data structures 37A-37B, each of these components may exist as separate modules or may be included in an integrated single data structure. In a distributed architecture, different components of data structure 37 may be stored in different locations and may be accessible to management application 18 via network 14.

Data structure 37 may be maintained by management application 18 at a memory location that is accessible to management application 18. For example, the memory location may be local to the management console 16 that executes management application 18 or may be remote to management console 16.

The management application 18 may also maintain policies 36, a list 38 of all volumes in a storage pool as well as a data structure 40 (shown as free space 40 and may also be referred to as free space 40) with information regarding all free storage space in a storage pool. Free space 40 may be a table, database or any other data structure. Free space 40 may be maintained by management application 18 at a memory location that is accessible to management application 18. For example, the memory location may be local to the management console 16 that executes management application 18 or may be remote to management console 16. Free space 40 may be maintained and updated by management application 18 by communicating with different storage systems 20 via network 14 or otherwise.

Free space 40 may include details regarding storage space that may be available for a user at any given time. The details may include type of storage, available storage space and any other information that can be used to provision and configure storage. In one embodiment, management application 18 may use policies 36, volume list 38, free space with access protocol information 40 and data structure 37 for configuring storage for migration.

Figure 1C:
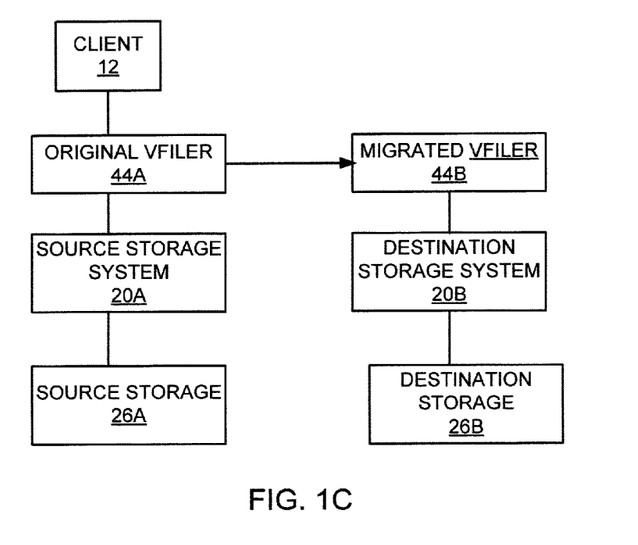
FIG. 1C shows a block diagram for migrating a virtual storage system, according to one embodiment.

Virtual Storage System Migration:

FIG. 1C shows an example of migrating a vfiler 44A associated with a source storage system 20A having access to source storage 26A, according to one embodiment. Source storage 26A may include one or more storage devices. The vfiler 44A is migrated to a destination storage system 20B having access to destination storage 26B. Destination storage 26B may also include one or more storage devices. The migrated vfiler is shown as 44B. The migration can be triggered by a client 12 request, pre-scheduled or for any other reason.

In one embodiment, the migration operation may be non-disruptive. Non-disruptive migration occurs when the first storage location (i.e. 26A) can be accessed while information is being migrated to another location (i.e. 26B). As explained above, even for non-disruptive migration, access to the source storage 26A may be restricted during cut-over, which is the last time slot in the migration timeline for completing a migration operation. To minimize disruption to the client, the cut-over duration should be short so that a client is not unduly limited to access storage. Therefore, it is desirable to know if a migration operation can be completed before the migration operation enters the cut-over duration. It is also desirable to know whether the destination storage 26B can handle post migration traffic so that client experience in accessing the migrated vfiler 44B is fast and efficient.

In one embodiment and as described below in more detail, management application 18 performs various executable process steps to predict the work load for both the source storage system 20A and the destination storage system 20B before the cut-over duration. The management application 18 also ascertains the projected utilization of destination storage 26B, to ensure that the destination storage system and the destination storage devices can handle the post migration work load, if the migration were to be completed.

The various adaptive embodiments of the present disclosure and the functionality of the management application are now described below with respect to the various process flow diagrams.

Figure 1D:
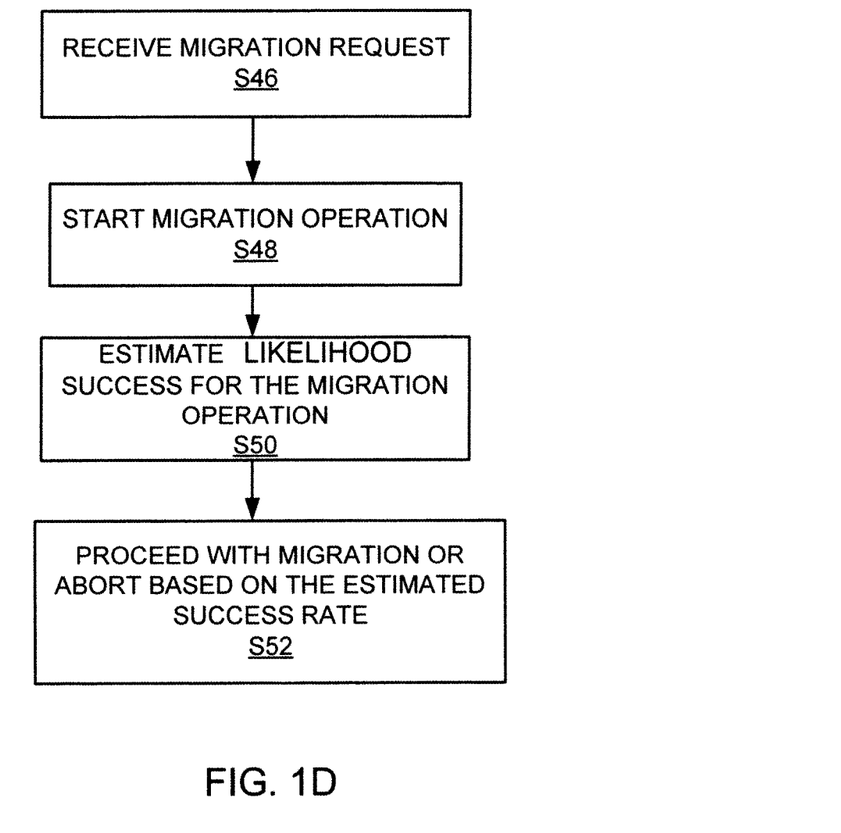
FIGS. 1D-1E show process flow diagrams for migrating a virtual storage system, according to one embodiment.

Process Flow:

FIG. 1D illustrates an overall process flow diagram, according to one embodiment. The process begins when a migration request to migrate a vfiler 44A (FIG. 10) from source storage system 20A to destination storage system 20B is received in block S46. The request may be initiated by a client, an administrator or any other entity. In one embodiment, the request is for a non-disruptive migration.

In block S48, the migration operation is initiated. During the migration operation, all client data serviced by vfiler 44A is moved from source storage device 26A to destination storage device 26B. Configuration information associated with the vfiler 44A is also migrated to destination storage device 26B.

Source storage system 20A and/or management application 18 also estimate when the migration operation may enter the cut-over duration. The estimate is based on the amount of information that is to be migrated and a rate at which the information is migrated during the migration operation.

In block S50, while the migration is taking place and before the migration operation enters the cut-over duration, management application 18 estimates the likelihood of a successful migration operation. A successful migration operation is one that is completed within the cut-over duration such that clients can easily send read and write requests. A successful migration operation also depends on whether destination storage device 26B can adequately support clients after vfiler 44A is migrated. Details regarding block S50 are provided below with respect to FIG. 1E.

Based on the estimated likelihood of success, either the migration operation is completed in block S52 or aborted and then re-tried at a later time. If the migration operation is to be aborted, management application 18 notifies the client. In one embodiment, management application 18 notifies the client before the migration operation is aborted and provides the client with an option to override management application 18's decision. This allows the client to proceed with the migration operation even though management application 18 may recommend that the migration operation be aborted.

To abort the migration operation, management application 18 sends a message to the source storage system 20A and the destination storage system 20B. Based on the message, the migration operation is aborted.

Figure 1E:
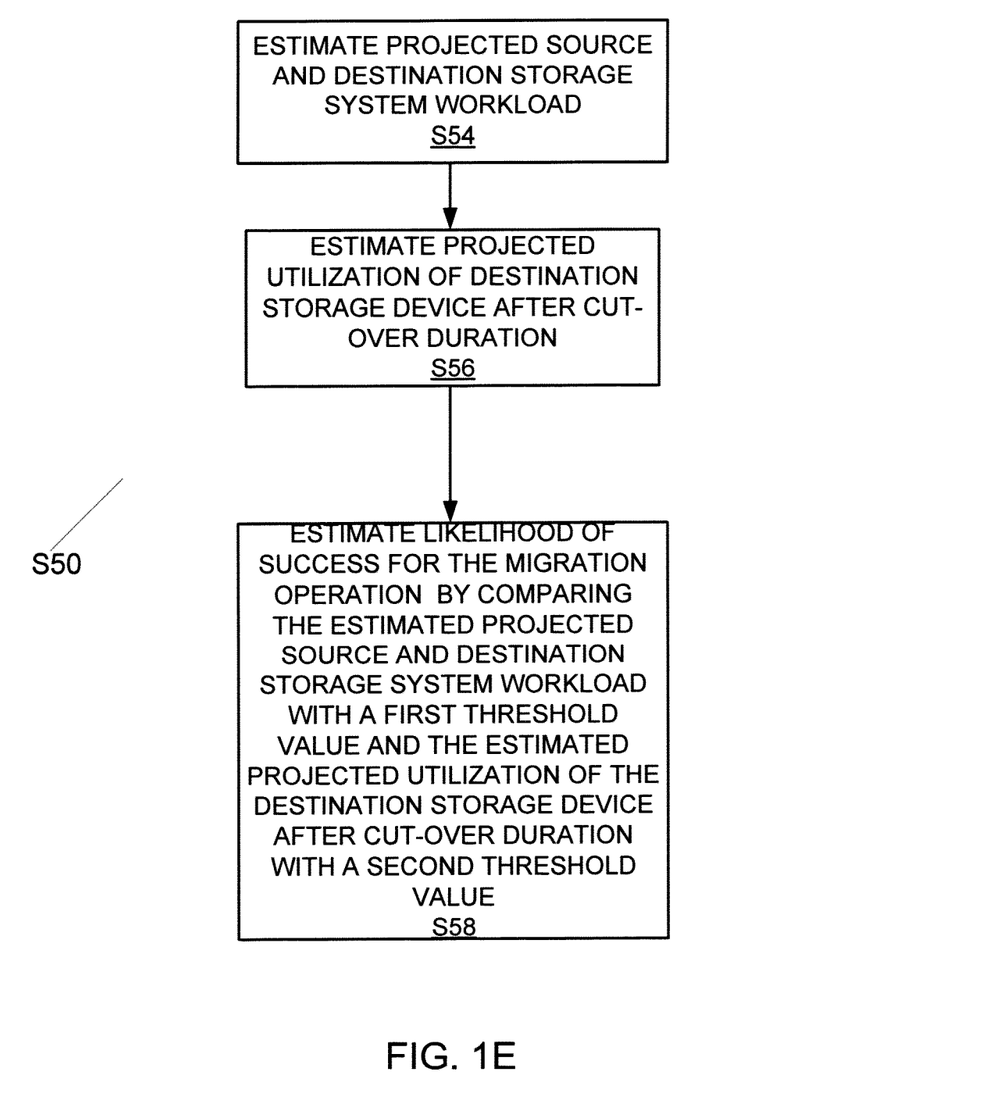
Figure 1F:
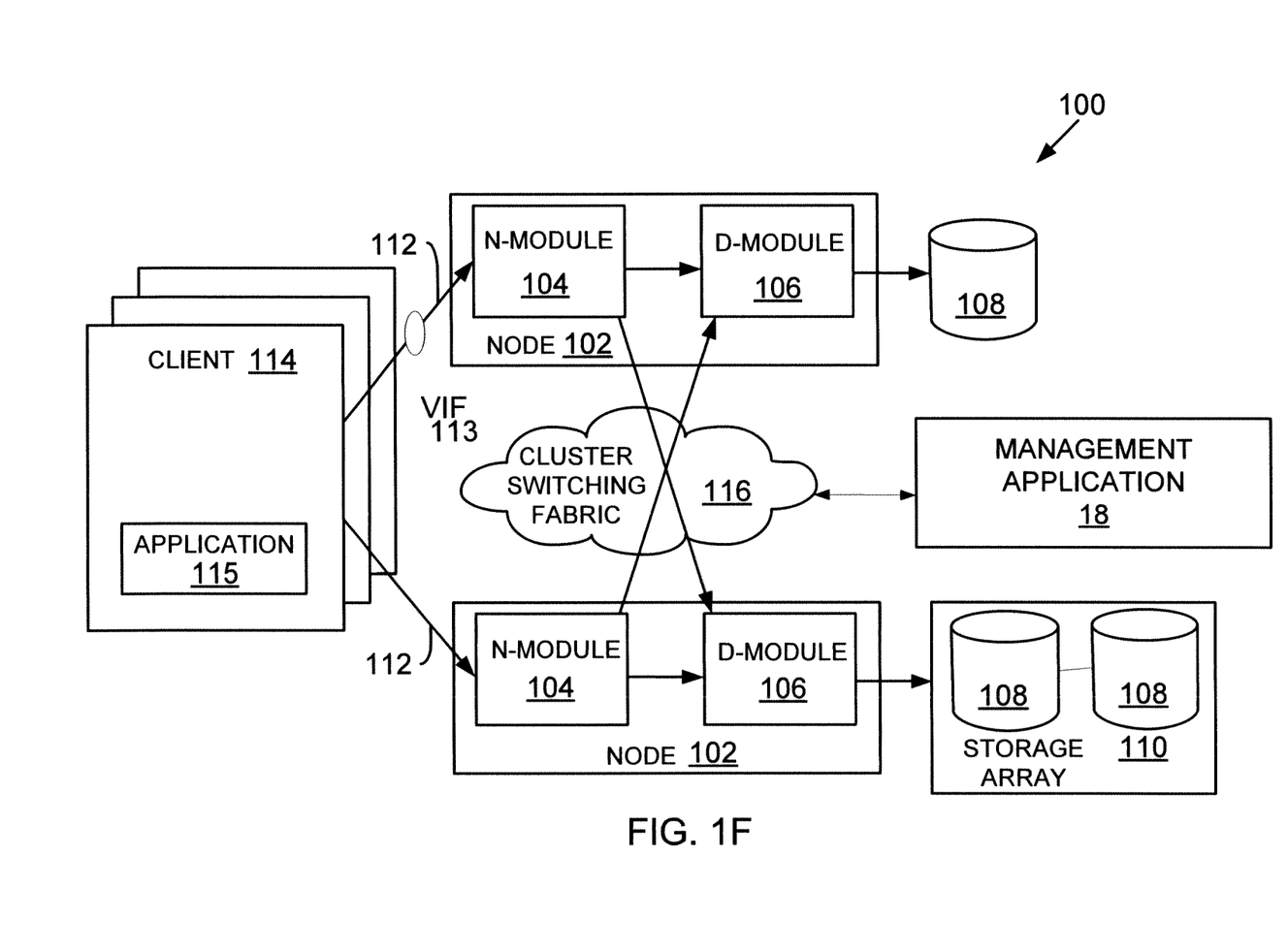
FIG. 1F shows a block diagram of a clustered system, according to one embodiment.

FIG. 1E shows a process flow diagram for block S50 of FIG. 1D, according to one embodiment. The process begins in block S54 when the projected workload for the processor(s) of both the source storage system 20A and the destination storage system 20B during the cut-over duration is determined. The projected workload is used by the management application 18 to ascertain whether the source storage system 20A and/or the destination storage system 20B will be over-utilized such that completion of the migration operation would be delayed beyond a threshold level. The threshold level is programmable and can be set to accommodate different operating environments. In one embodiment, the threshold level may be stored by an administrator using the management console 16 at a memory location as part of configuration information 37A and/or storage system information 37B (FIG. 1B).

In one embodiment, the projected workload may be ascertained by using the following relationship:

Projected Processor Utilization (PPU)=Current CPU busy+(SEQWriteOPs*SeqFactor)+ (RndWriteOps-RndFactor)+ (SeqReadOps*SeqReadFactor)+ (RndReadOps*RndReadFactor)   (Equation I)

PPU is determined by management application 18 and then compared to the threshold value designated as "MaxBusy". Based on the comparison, management application 18 determines if the PPU is acceptable or unacceptable. For example, when PPU is less than MaxBusy, then one can assume that the storage system can handle the migration and the migration is likely to be successful. In this example, the PPU is acceptable. If the PPU is greater than MaxBusy, then the projected workload of the source and/or destination systems will be such that the migration operation may not be successful or may be undesirably delayed. In this case, the PPU is unacceptable.

The various parameters for Equation 1 are now defined below:

"Current CPU busy" is a factor that indicates how busy a processor may be before entering the cut-over duration. This factor is used for both the source storage system and the destination storage system. Information regarding how busy a CPU maybe is obtained by management application 18 from the operating systems of the source storage system and the destination storage system. In one embodiment, provisioning manager 30 makes a Zephyr Application Program Interface (ZAPI) call to the operating system of the source storage system 20A and the destination storage system 20B and gathers the status of the various processors used by the source and destination storage systems. The obtained information may be stored as part of storage system information 37B (FIG. 1B).

"SeQWriteOPs" means a number of sequential write operations that the source storage system 20A and the destination storage system 20B have to process during the cut-over duration. The term sequential means sequential logical block addresses (LBA) where data is written sequentially at storage devices 26A and 26B. The operating systems of the source storage system 20A and destination storage systems 26B maintain this information because they have to process write requests for clients. This information is obtained by provisioning manager 30 and may be stored as part of storage system information 37B.

"SeqFactor" is a numerical value that is used to quantify the affect of sequential write operations during cut-over. The write operations may be performed by the source storage system 20A and/or the destination storage system 20B.

The SeqFactor can be determined during storage system testing, for example, in a laboratory test environment, where one can observe how sequential write operations increase or affect storage processor performance. Briefly, fewer sequential operations will have less of an impact on processor utilization compared to the impact of a higher number of sequential write operations. The impact of write operations is simulated and then translated to a numerical value that is used in Equation I.

"RndWriteOPs" in this context means random write operations at storage devices 26A and 26B. The term random as used herein means "non-sequential", i.e., data is not written in sequential logical block addresses. The random write operations during cut-over also impact processor utilization, except the impact of random write operations may be more severe than sequential write operations. The number of random write operations is also maintained by the operating systems of both the storage system 20A and 20B, respectively. This information is obtained by provisioning manager 30 and then may be stored as part of storage system information 37B.

"RndFactor" is a numerical factor used to quantify the affect of random write operations during cut-over. The RndFactor is similar to the SeqFactor, except it is used for quantifying the impact of random write operations instead of the impact of sequential write operations. This factor can also be derived in a system test environment and then stored as part of storage system information 37B.

"SeqReadOps" means a number of sequential read operations that the source storage system 20A has to service during cut-over. The read operations are for the original vfiler 44A before the migration is completed. Sequential read operations only impact the source storage system 20A and not the destination storage system 20B because clients only access vfiler 44A before it is migrated. The number of sequential read operations is also maintained by the operating system of source storage system 20A. This information can be obtained by provisioning manager 30 and then stored as storage system information 37B.

"SeqReadFactor" is similar to the SeqFactor except SeqReadFactor quantifies the impact of sequential read operations. This factor may also be ascertained by trial and error in a system test environment and then stored as part of storage system information 37B.

"RndReadOps" is similar to RnDWriteOps, except it quantifies the impact of random read operations compared to random write operations. The number of random read operations is also maintained by the operating system of source storage system 20A. This information can be obtained by provisioning manager 30 and then stored as part of storage system information 37B.

"RndReadFactor" is similar to Rndfactor except it is applicable to random read operations. This factor may also be ascertained by trial and error in a system test environment and then stored as part of storage system information 37B.

Management application 18 uses the foregoing values/factors stored as storage system information 37B to ascertain PPU. In one embodiment, a processor executing executable instructions uses the various values/factors to calculate PPU values for the source storage system 20A and the destination storage system 20B.

Referring back to FIG. 1E, in block S56, management application 18 estimates destination storage 26B utilization, if the migration operation were to be completed. One reason for this estimation is to ascertain the possible impact of the migration operation on destination storage 26B and its ability to service client requests.

In block S56, management application 18 ascertains how much data the clients are writing to vfiler 44A before entering the cut-over duration. During cut-over, information is written to both source storage 26A and destination storage 26B so that both storage systems are synchronized after the cut-over duration, and once the migration operation is completed, management application 18 determines how much of destination storage 26B is being used before cut-over. Management application 18 then ascertains the amount of work (i.e. write operations) that is being done on the source storage device 26A and projects how busy the destination storage device 26B would get, once the write operation during the cut-over duration are added to an existing work load of destination storage 26B.

The projected destination storage device utilization is then compared to a threshold value. The threshold value may be stored as part of configuration information 37A and/or storage system information 37B.

The comparison with the threshold value is used to determine if the projected destination storage device utilization is acceptable or unacceptable. For example, if projected utilization is over 75% then it may be too high and hence unacceptable. In that case, the migration operation does not enter the cut-over stage because the comparison provides the likelihood of the destination storage's inability to efficiently handle the post migration work load. Thereafter, the migration operation is aborted.

The projected destination storage device utilization may be referred to as "AggrBusy" that is determined by the following equation:

$$\text{AggrBusy} = \text{CurrentAggrDiskBusy} + (\text{data throughput (MB/sec)} * \text{Write\_overhead}) / (\#\text{data\_disk\_in\_aggr} * \text{Disk\_factor}) \quad \text{(Equation II)}$$

The various parameters of Equation II are now described below:

"CurrentAggrDiskBusy" is a numerical value that provides an indication of how busy destination storage 26B is before cut-over. Provisioning manager 30 obtains this information from the operating system of destination storage system 20B that maintains a count value of what is being written to destination storage 26B and how much free space may be available at destination storage 26B.

"Data throughput" is a current amount of data that the source storage system 20A writes to the source storage device 26B. This information is also obtained by provisioning manager 30 from the operating system of source storage system 20A that handles all write operations for vfiler 44A.

"Write_overhead" is a numerical factor that is used to account for any extra writing the source storage system 20A does for each client write operation. The extra writing may be to store any metadata for information that is written to source storage 26A.

"#data_disk_in_aggr" is a number of storage devices (or disks) that the destination storage system 26B is using for handling the write operations during cut-over. Higher the number of storage devices lesser the utilization for each storage device.

"Disk_factor" is a numerical value to account for different types of storage devices. For example, a faster storage device will show less increase in utilization than slower disks for a same amount of workload.

Write_overhead of Equation II may be determined by the following equation:

$$\text{Write\_overhead} = (\text{RndWriteOps} * 6 + \text{SeqWriteOps} * 33) / (\text{vfiler\_write\_bytes in KB/sec}) \quad \text{(Equation III)}$$

The various parameters used for determining Write_overhead have been described above with respect to Equation (I).

Referring back to FIG. 1E, in block S58, management application 18 compares the PPU value for both the source storage system and the destination storage system with a first threshold value and AggrBusy with a second threshold value. Based on the comparison, management application 18 automatically predicts the likelihood of success for the migration operation.

The foregoing process steps for migrating a vfiler may be implemented in a cluster environment that is now described below in detail with respect to FIG. 1F.

Clustered System:

As described above, management application 18 may interface with storage systems 20 and client systems 12 for performing the various process blocks of FIGS. 1D-1E. The storage systems may be a part of a cluster 100 (or clustered storage system 100) that is now described below in detail with respect to FIGS. 1F and 2.

Cluster 100 includes a plurality of interconnected nodes 102 configured to provide storage services related to information stored at a plurality storage devices 108. Management application 18 communicates with the plurality of nodes 102 for generating and maintaining the data structures described above with respect to FIG. 1B. A global namespace is used to uniquely identify cluster system 100. The global namespace information may be a part of data structure 37 and may be used for migrating information from one storage volume to another storage volume within the cluster.

Nodes 102 comprise various functional components that cooperate to provide distributed storage system architecture of cluster 100. Each node 102 is generally organized as a network element (N-module 104) and a disk element (D-module 106). N-module 104 includes functionality that enables node 102 to connect to clients 114 over a computer network 112 and to management application 18, while each D-module 106 connects to one or more storage devices 108 (may generically be referred to as disks 108) or storage array 110 (similar to storage subsystem 26, FIG. 1A and may also be referred to as disk array 110). In one embodiment, information regarding the storage devices may be collected by the D-Module and then communicated to the management application 18 by the N-module.

Nodes 102 may be interconnected by a cluster switching fabric 116 which, in the illustrative embodiment, may be embodied as a Gigabit Ethernet switch. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 102 comprising one N-module and one D-module should be taken as illustrative only.

Clients 114 (similar to clients 12, FIG. 1A) may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits.

Clients 114 may request management services from management application 18. In one embodiment, clients 114 may request migration of a vfiler 44A (FIG. 1C) as described above.

Clients 114 may be configured to interact with the node 102 in accordance with a client/server model of information delivery. That is, each client 114 may request the services of the node 102, and the node 102 may return the results of the services requested by the client 114, by exchanging packets over the network 112.

The client 114 may issue packets using application 115 including file-based access protocols, such as the CIFS protocol or the NFS protocol, over TCP/IP when accessing information in the form of certain data containers. Data container means a block, a file, a logical unit of data or any other information. CIFS means the Common Internet File System Protocol, an access protocol that client systems use to request file access services from storage systems over a network. NFS means Network File System, a protocol that allows a user to access storage over a network.

Alternatively, the client 114 may issue packets using application 115 including block-based access protocols, such as the Small Computer Systems Interface ("SCSI") protocol encapsulated over TCP (iSCSI) and SCSI encapsulated over FCP when accessing information in the form of other data containers, such as blocks.

A switched virtualization layer including a plurality of virtual interfaces (VIFs) 113 is provided below the interface between the respective N-module 104 and the client systems 114, allowing the storage 108 associated with the nodes 102 to be presented to the client systems 114 as a single shared storage pool.

The clustered storage system 100 can be organized into any suitable number of vfilers, in which each vfiler represents a single storage system namespace with independent network access. Each vfiler has a user domain and a security domain that are separate from the user and security domains of other vfilers. Moreover, each vfiler is associated with one or more VIFs and can span one or more physical nodes, each of which can hold one or more VIFs and storage associated with one or more vfilers. Client systems can access the data on a vfiler from any node of the clustered system, but only through the VIFs associated with that vfiler.

A vfiler can be migrated from one node to another in cluster 100, as described above. Management application 18 performs the executable process steps of FIGS. 1D-1E for estimating a likelihood of success for a migration operation.

Figure 2:
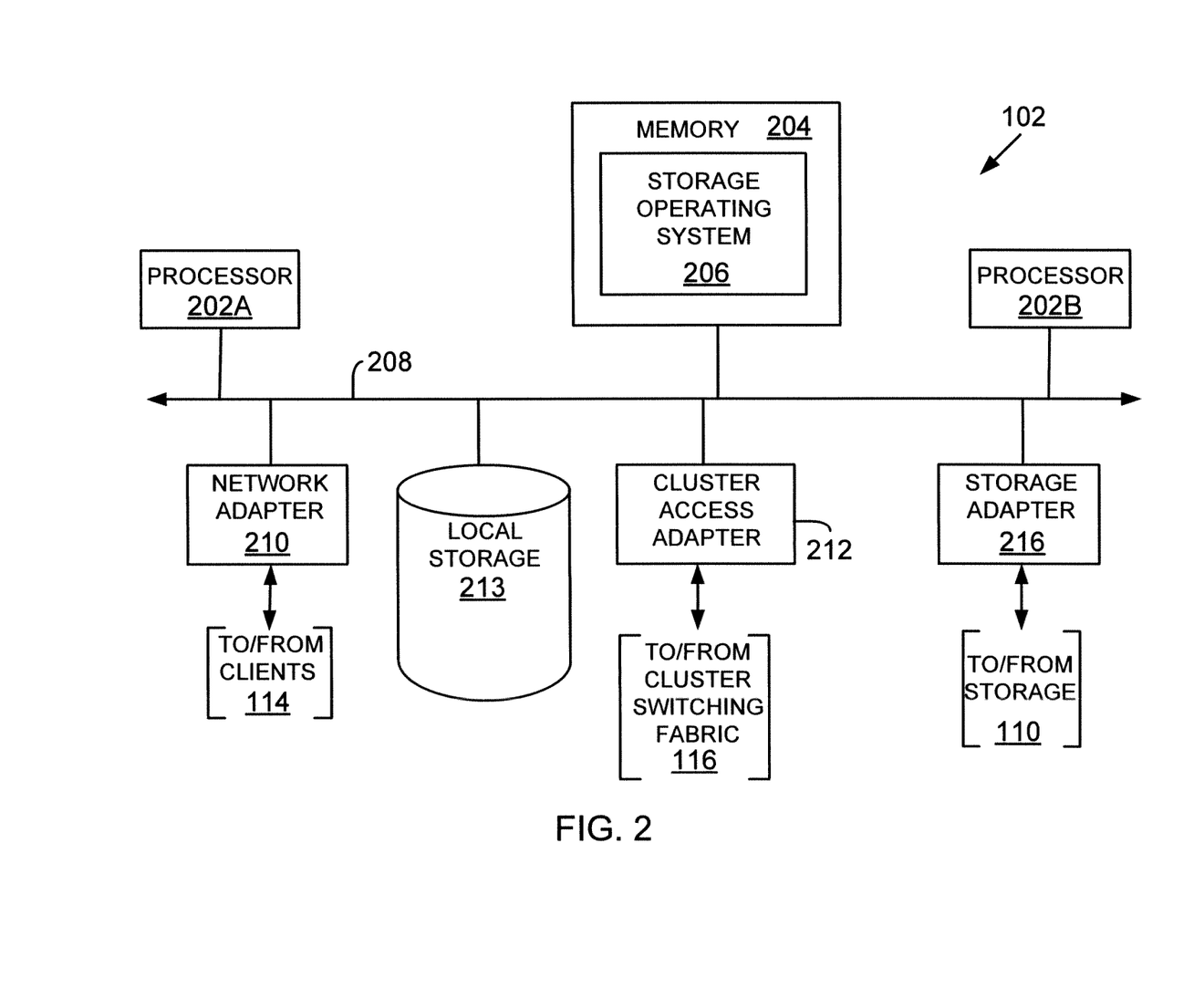
FIG. 2 shows a block diagram of a node, used according to one embodiment.

Storage System Node:

FIG. 2 is a block diagram of a node 102 that is illustratively embodied as a storage system and interfaces with management application 18 for generating and maintaining the data structures 37, described above with respect to FIG. 1B. Node 102 may include a plurality of processors 202A and 202B, a memory 204, a network adapter 210, a cluster access adapter 212, a storage adapter 216 and local storage 213 interconnected by a system bus 208. The local storage 213 comprises one or more storage devices, such as disks, utilized by the node to locally store configuration information.

The cluster access adapter 212 comprises a plurality of ports adapted to couple node 102 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 212 is utilized by the N/D-module for communicating with other N/D-modules in the cluster 100.

Each node 102 is illustratively embodied as a dual processor storage system executing a storage operating system 206 that preferably implements a high-level module, such as a file system, to logically organize the information as a hierarchical structure of named directories, files and special types of files called virtual disks (hereinafter generally "blocks") on storage devices 108. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the D-module 106.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 206, portions of which is typically resident in memory and executed by the processing elements, functionally organizes the node 102 by, inter alia, invoking storage operations in support of the storage service implemented by the node. An example of operating system 206 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 210 comprises a plurality of ports adapted to couple the node 102 to one or more clients 114 over point-to-point links, wide area networks, virtual private networks implemented over a public network (Internet) or a shared local area network. The network adapter 210 thus may comprise the mechanical, electrical and signaling circuitry needed to connect the node to the network. Illustratively, the computer network 112 may be embodied as an Ethernet network or a FC network. Each client 114 may communicate with the node over network 112 by exchanging discrete frames or packets of data according to pre-defined protocols, such as TCP/IP.

The storage adapter 216 cooperates with the storage operating system 206 executing on the node 102 to access information requested by the clients and management application 18. The information may be stored on any type of attached array of writable storage device media such as video tape, optical, DVD, magnetic tape, bubble memory, electronic random access memory, flash memory devices, micro-electro mechanical and any other similar media adapted to store information, including data and parity information. However, as illustratively described herein, the information is preferably stored on the disks 108 of storage array 110. The storage adapter 216 comprises a plurality of ports having input/output (I/O) interface circuitry that couples to the disks over an I/O interconnect arrangement, such as a conventional high-performance, FC link topology.

Figure 3:
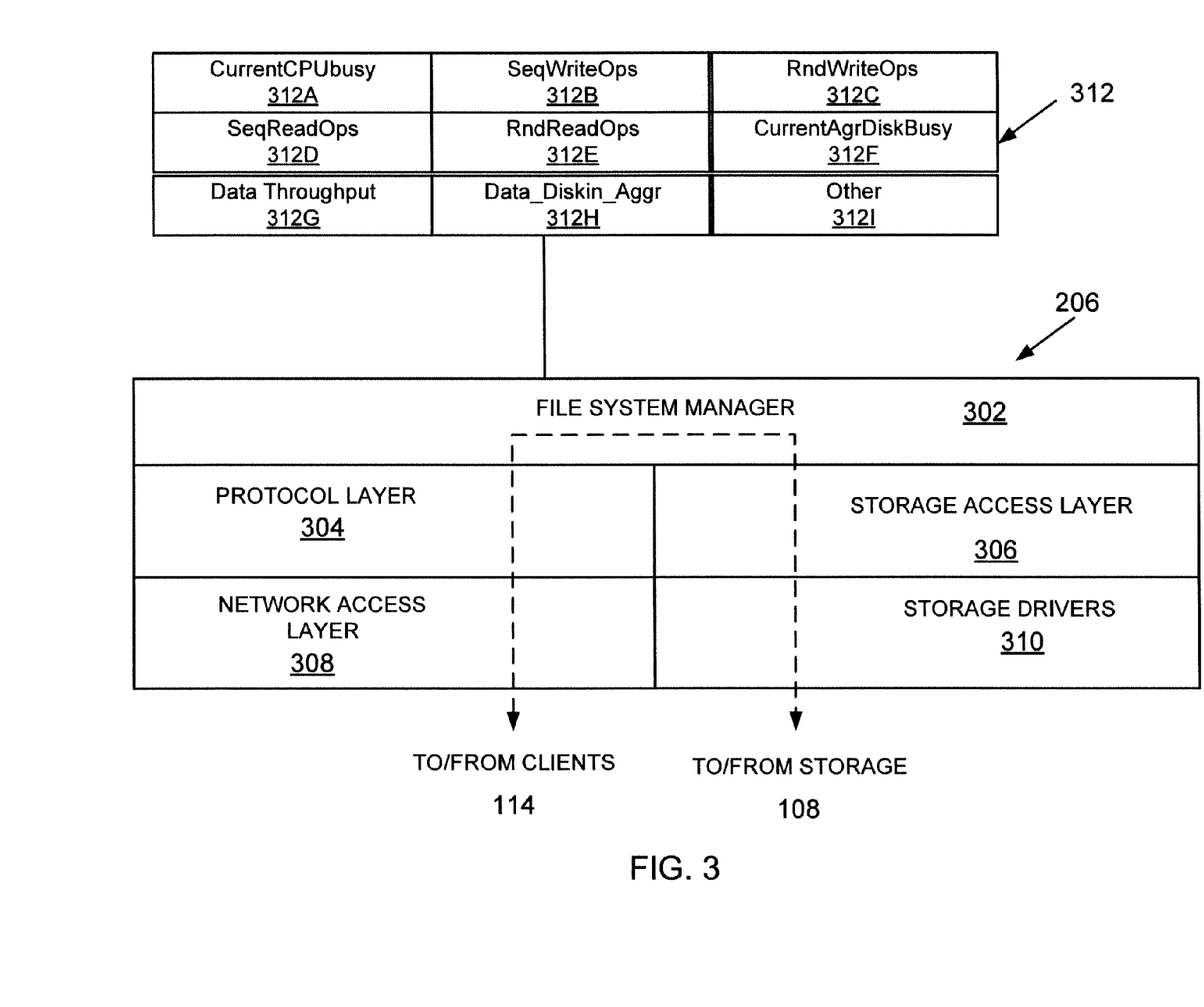
FIG. 3 shows an example of an operating system used according to one embodiment.

Operating System:

FIG. 3 illustrates a generic example of operating system 206 executed by node 102, according to one embodiment of the present disclosure. Operating system 206 may be used to provide information regarding node 102/storage system 20 to management application 18 and perform the actual non-disruptive migration described above. For example, operating system 206 may maintain a data structure 312 for providing information to management application 18 that can be used for performing the various process blocks of FIGS. 1D-1E.

Data structure 312 may include different components. For example, data structure 312 may include CurrentCPUbusy data 312A, SeqWriteOps 312B, RndWriteOps 312C, SeqReadOps 312D, RndReadOps 312E, CurrentAgrDiskBusy 312F, data throughput 312G and data_diskin_aggr 312H. Other data 312I may include any other information (for example, "Disk_factor") that is used by management application 18 to perform the various process steps described above. These factors have been described above with respect to FIGS. 1D-1E. Operating system 206 provides this information to management application 18 for estimating processor utilization and storage device utilization in blocks S54 and S56 of FIG. 1E.

In one example, operating system 206 may include several modules, or "layers" executed by one or both of N-Module 104 and D-Module 106. These layers include a file system manager 302 that keeps track of a directory structure (hierarchy) of the data stored in storage devices and manages read/write operations, i.e. executes read/write operations on disks in response to client 114 requests.

Operating system 206 may also include a protocol layer 304 and an associated network access layer 308, to allow node 102 to communicate over a network with other systems, such as clients 114 and management application 18. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 114 and mass storage devices 108 are illustrated schematically as a path, which illustrates the flow of data through operating system 206.

The operating system 206 may also include a storage access layer 306 and an associated storage driver layer 310 to allow D-module 106 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI.

It should be noted that the software "path" through the operating system layers described above needed to perform data storage access for a client request received at node 102 may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by node 102 in response to a file system request issued by client 114.

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 4:
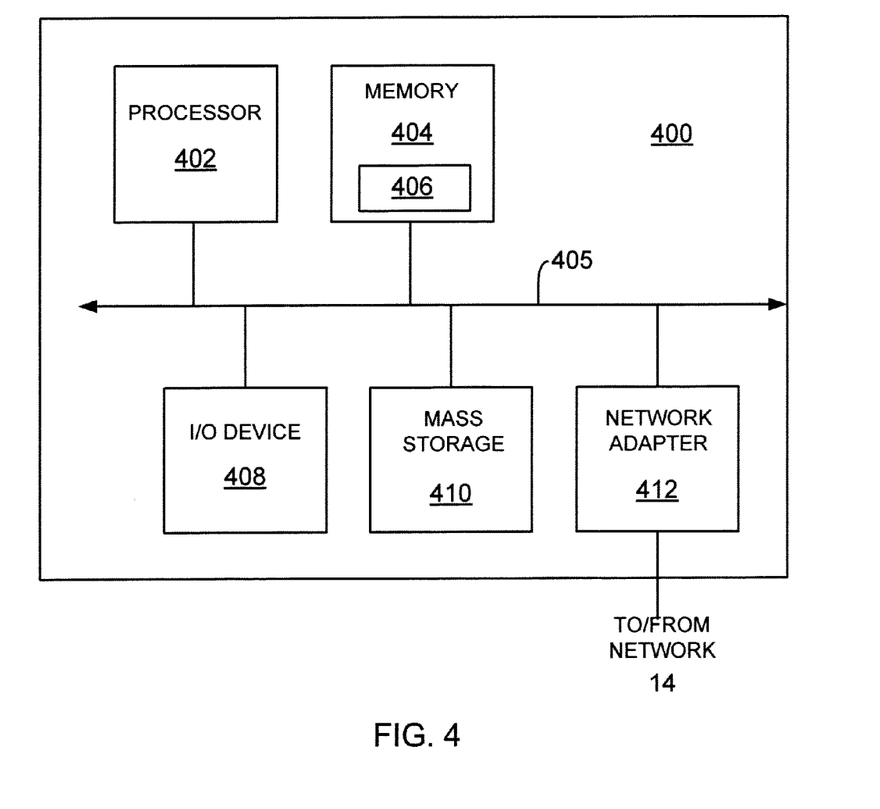
FIG. 4 shows a block diagram of a computing system for implementing the adaptive process of the present disclosure.

Processing System:

FIG. 4 is a high-level block diagram showing an example of the architecture of a processing system, at a high level, in which executable instructions for non-disruptive migration as described above, can be implemented. The processing system 400 can represent management console 18, clients 12 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements the migration techniques introduced above (e.g., the management application 18 in FIG. 1B) may reside in and may be executed (by processors 402) from memory 404.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers 20) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, a method and apparatus for vfiler migration have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for migrating a virtual storage system from a source storage system having access to a source storage device to a destination storage system having access to a destination storage device, where the source storage system executes a processor executable storage operating system for presenting the virtual storage system to a plurality of client systems and managing the source storage device to read and write information at the source storage device for the plurality of client systems via the virtual storage system, comprising:

prior to entering a cut-over duration for completing a migration operation, determining a projected workload of the source storage system during the cut-over duration; wherein the plurality of client systems can access the source storage device via the virtual storage system during the migration operation, except during the cut-over duration when access to the source storage device is restricted;

determining a projected work load of the destination storage system during the cut-over duration when access to the destination storage system is restricted;

wherein the projected workload of the source storage system and the destination storage system during the cut-over duration is based on a factor that indicates how busy a processor of the source storage system and a processor of the destination storage system will be during the cut-over duration; a number of sequential and random read and write operations at the source storage system and the destination storage system during the cut-over duration; and a numerical factor to quantify an affect of the sequential and random read and write operations on the migration operation;

determining projected utilization of the destination storage device after the cut-over duration, if the virtual storage system were to be successfully migrated from the source storage system to the destination storage system within the cut-over duration;

estimating a likelihood of success for completing the migration operation in response to the migration request within the cut-over duration; and proceeding with the migration operation in response to the migration request based on the estimated likelihood of success when the migration operation can be completed within the cut-over duration and an acceptable projected utilization of the destination storage device after the migration is completed.

2. The method of claim 1, further comprising;

aborting the migration operation if the estimated likelihood of success for completing the migration operation is unacceptable.

3. The method of claim 1, wherein the projected work load of the source storage system and the destination storage system are compared to a first threshold value and the estimated likelihood of success is determined based on the comparison.

4. The method of claim 1, wherein the projected utilization of the destination storage device is compared to a second threshold value and the estimated likelihood of success is determined based on the comparison.

5. The method of claim 1, wherein the source storage system and the destination storage system are included within a cluster system.

6. The method of claim 1, wherein the source storage system and the destination storage system are based in a non-cluster based system.

7. A machine implemented method for migrating a virtual storage system from a source storage system having access to a source storage device to a destination storage system having access to a destination storage device, where the source storage system executes a processor executable storage operating system for presenting the virtual storage system to a plurality of client systems and managing the source storage device to read and write information at the source storage device for the plurality of client systems via the virtual storage system, comprising:

prior to entering a cut-over duration, estimating a likelihood of success for completing a migration operation for migrating the virtual storage system from the source storage system to the destination storage system; wherein the likelihood of success for completing the migration operation is based on a projected workload of the source storage system and the destination storage system during the cut-over duration, when access to the source storage device is restricted; and the projected utilization is based on a factor that indicates how busy a processor of the source storage system and a processor of the destination storage system will be during the cut-over duration; a number of sequential and random read and write operations at the source storage system and the destination storage system during the cut-over duration; and a numerical factor to quantify an affect of the sequential and random read and write operations on the migration operation;

determining if the estimated likelihood of success is acceptable or unacceptable; wherein the likelihood of success is acceptable when the migration operation can be completed within the cut-over duration and a destination storage device is able to manage post migration operations; and aborting a migration operation if the estimated likelihood of success is unacceptable.

8. The method of claim 7, further comprising:
proceeding with the migration operation if the estimated likelihood of success is acceptable.

9. The method of claim 7, wherein the projected work load of the source storage system and the destination storage system is determined by a management application prior to entering the cut-over duration when access to the source storage system and the destination storage system is restricted.

10. The method of claim 7, wherein the source storage system and the destination storage system are included within a cluster system.

11. The method of claim 7, wherein the source storage system and the destination storage system are based in a non-cluster based system.

12. A method for migrating a virtual storage system managed by a source storage system having access to a source storage device to a destination storage system having access to a destination storage device, where the source storage system executes a processor executable storage operating system for presenting the virtual storage system to a plurality of client systems and managing the source storage device to read and write information at the source storage device for the plurality of client systems via the virtual storage system, comprising:
estimating a likelihood of success for completing a migration operation based on a projected usage of the source storage system and the destination storage system during a cut-over duration when access to the source storage system and the destination storage system is restricted; and a projected utilization of the destination storage device after the cut-over duration, if the migration operation were to be successfully completed;
wherein the projected workload of the source storage system and the destination storage system during the cut-over duration is based on a factor that indicates how busy a processor of the source storage system and a processor of the destination storage system will be during the cut-over duration; a number of sequential and random read and write operations at the source storage system and the destination storage system during the cut-over duration; and a numerical factor to quantify an affect of the sequential and random read and write operations on the migration operation; and
aborting the migration operation, if the estimated likelihood of success is unacceptable when the migration operation cannot be completed within the cut-over duration or if the projected utilization of the destination storage device after the cut-over duration is unacceptable.

13. The method of claim 12, further comprising:
proceeding with the migration operation, if the estimated likelihood of success is acceptable.

14. The method of claim 12, wherein the projected work load of the source storage system and the destination storage system are compared to a first threshold value and the estimated likelihood of success is determined based on the comparison.

15. The method of claim 12, wherein the projected utilization of the destination storage device is compared to a second threshold value and the estimated likelihood of success is determined based on the comparison.

16. The method of claim 12, wherein the source storage system and the destination storage system are included within a cluster system.

17. The method of claim 12, wherein the source storage system and the destination storage system are based in a non-cluster based system.

18. A system, comprising:
a processor for a source storage system executing a storage operating system for presenting a virtual storage system to a plurality of client systems and managing a source storage device to read and write information at the source storage device for the plurality of client systems via the virtual storage system;
a processor for a destination storage system having access to a destination storage device; wherein, during a migration operation, the virtual storage system is migrated from the source storage system to the destination storage system; and
a processor for a computing system executing a management application, where the management application interfaces with the source storage system and the destination storage system for estimating a likelihood of success for completing the migration operation based on a projected usage of the source storage system and the destination storage system during a cut-over duration when access to the source storage system and the destination storage system is restricted; and a projected utilization of the destination storage device after the cut-over duration, if the migration operation were to be successfully completed;
wherein the projected workload of the source storage system and the destination storage system during the cut-over duration is based on a factor that indicates how busy a processor of the source storage system and a processor of the destination storage system will be during the cut-over duration; a number of sequential and random read and write operations at the source storage system and the destination storage system during the cut-over duration;
and a numerical factor to quantify an affect of the sequential and random read and write operations on the migration operation; and
wherein the migration operation is aborted, if the estimated likelihood of success is unacceptable when the migration operation cannot be completed during the cut-over duration or if the projected utilization of the destination storage is unacceptable.

19. The system of claim 18, wherein the migration operation is completed, if the estimated likelihood of success is acceptable.

20. The system of claim 18, wherein the projected work load of the source storage system and the destination storage system are compared to a first threshold value and the estimated likelihood of success is determined based on the comparison.

21. The system of claim 18, wherein the projected utilization of the destination storage device is compared to a second threshold value and the estimated likelihood of success is determined based on the comparison.

22. A non-transitory, machine readable storage medium storing executable instructions, which when executed by a machine, causes the machine to perform a method for migrating a virtual storage system from a source storage system to a destination storage system, the method comprising:
prior to entering a cut-over duration, estimating a likelihood of success for completing a migration operation for migrating the virtual storage system from the source storage system to the destination storage system;
wherein the likelihood of success for completing the migration operation is based on a projected workload of the source storage system and the destination storage system during the cut-over duration, when access to the source storage device is restricted; and the projected utilization is based on a factor that indicates how busy a processor of the source storage system and a processor of the destination storage system will be during the cut-over duration; a number of sequential and random read and write operations at the source storage system and the destination storage system during the cut-over duration; and a numerical factor to quantify an affect of the sequential and random read and write operations on the migration operation;

determining if the estimated likelihood of success is acceptable or unacceptable;

wherein the likelihood of success is acceptable when the migration operation can be completed within the cut-over duration and a destination storage device is able to manage post migration operations; and aborting the migration operation if the estimated likelihood of success is unacceptable.

23. The non-transitory storage medium of claim 22, wherein the migration operation enters the cut-over duration when the estimated likelihood of success is acceptable.

24. The non-transitory storage medium of claim 22, wherein the projected work load of the source storage system and the destination storage system is determined by a management application prior to entering the cut-over duration when access to the source storage system and the destination storage system is restricted.

* * * * *